Jan. 16, 1968  G. D. MYLANDER  3,363,641
AUTOMATIC FLOW CONTROL VALVE RESPONSIVE TO LIQUID LEVEL
Filed April 9, 1965

INVENTOR.
GERALD D. MYLANDER
BY
ATTORNEY

0
United States Patent Office 3,363,641
Patented Jan. 16, 1968

3,363,641
AUTOMATIC FLOW CONTROL VALVE
RESPONSIVE TO LIQUID LEVEL
Gerald D. Mylander, 1511 Harle Place,
Anaheim, Calif. 92802
Filed Apr. 9, 1965, Ser. No. 446,883
7 Claims. (Cl. 137—393)

ABSTRACT OF THE DISCLOSURE

This invention is of an automatic shutoff valve for operation during filling of a container with liquefied gas such as propane, butane and the like. It comprises a flow control member which is urged to flow permitting position by incoming liquefied gas, and to flow preventing position by pressure within a control chamber as derived from a given location or level within the container.

The device is capable of distinguishing between vapor pressure and liquid pressure by having a pair of substantially similar orifices one interposed between the container and the control chamber and the other interposed between the control chamber and a vent to atmosphere. This structure enables the automatic shutoff valve to respond to the occurrence of liquid at the predetermined level to shut off the flow control device regardless of variations in ambient conditions within a relative wide range thereof.

---

This invention relates generally to flow control devices, and more particularly to automatic shutoff devices for use in controlling the flow of liquid petroleum gas and like materials.

Liquid petroleum gas, such as propane and butane, is used extensively today particularly where natural or manufactured household gas is unavailable. Such fuels are extremely volatile and burn very readily in either the liquid or vapor phases. These characteristics make liquid petroleum extremely desirable for use as fuels in virtually any type of heating application.

Such liquids must be handled very cautiously due to certain characteristics thereof. For instance, liquid gas such as propane and butane have extremely low boiling points, considerably lower than normal atmospheric temperatures. Thus, they vaporize very readily under normal temperature conditions. Also, the vapor pressure of such liquids is extremely high so that they are extremely volatile at ordinary ambient temperatures and pressures.

In addition to the foregoing characteristics, such liquid petroleum products haxe extremely high thermal coefficients of expansion such that even moderate changes in temperature thereof cause such products to expand or contract appreciably. For this reason, it is necessary to maintain a void or space within any tank or vessel wherein such liquid petroleum is stored. A fixed percentage of the volume of any such vessel or container must be left unoccupied with the liquid gas to allow for expansion. In fact, such requirement is now a law in most if not all states, making it a crime to fill any tank or vessel with liquid gas beyond a certain percentage of the volume thereof.

Prior devices for controlling the amount of liquid gas pumped into a given container have comprised little more than a dip-tube at the proper level in the tank and through which the liquid gas passed when it reached a predetermined level in the container. Such liquid was conducted from the dip-tube to the atmosphere by suitable conduit means associated therewith. Upon exposure to the atmosphere, it quickly expanded and evaporated into a gas, thereby creating heavy white clouds in the atmosphere. Such clouds became the telltale sign for the operator of the filling equipment to turn off the pump and thereby terminate the filling operation.

Such prior systems for filling tanks and other vessels necessitated an alert operator to turn off the equipment at the right time. In the event the operator failed to respond at the right time, the tank could be filled considerably above the safe limit. Thereafter, in the event of even a moderate increase in temperature of the liquid, the pressure relief valve associated with the tank would open due to the dangerously high pressure. However, such pressure changes were found to be so abrupt and so great that virtually no pressure relief valve operated satisfactorily under these conditions.

In the event a proper pressure relief valve was not employed in the unit, the entire tank would rupture, creating an extremely hazardous condition wherein this highly volatile liquid and vapor was spilled out into the surrounding area. A subsequent spark could produce a holocaust. Entire fields of storage tanks have been destroyed from conditions such as this.

To prevent the occurrence of such hazardous conditions, it became apparent that an automatic shutoff device should be provided for quickly and firmly interrupting the filling operation of any tank or vessel whenever the liquid therewith reached a predetermined level. Such device was to be operable independently of the human operator so that the shutoff feature would be obtained under any and all conditions.

It is an object of the present invention to provide a flow control device for use with volatile liquids to firmly interrupt the flow of liquid upon the occurrence of a predetermined condition.

Another object of the present invention is to provide flow control means for use with liquid gas or other volatile liquids which is capable of distinguishing between vapor and liquid.

Another object of the present invention is to provide a flow control device as characterized above which is operable to sense when the level of such liquid gas reaches a predetermined height within a given vessel or container.

Another object of the present invention is to provide a flow control device for valatile fluids as characterized above wherein pressure variations incidental to passage of vapor and liquids through an orifice is used for indicating when the liquid level within a vessel reaches a predetermined height.

Another object of the present invention is to provide a flow control device as characterized above which is manually operable to flow permitting position but which it automatically operable to flow preventing position upon the occurrence of a predetermined amount of liquid gas within a given vessel.

A still further object of the present invention is to provide a flow control device as characterized above which is pressure operated so that upon occurrence of predetermined pressure associated with liquid gas such valve is automatically returned to its flow preventing position.

A still further object of the present invention is to provide a flow control device as characterized above which is simple and inexpensive to manufacture, and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

Like reference characters indicate corresponding parts throughout the several views of the drawings.

Figure 1:
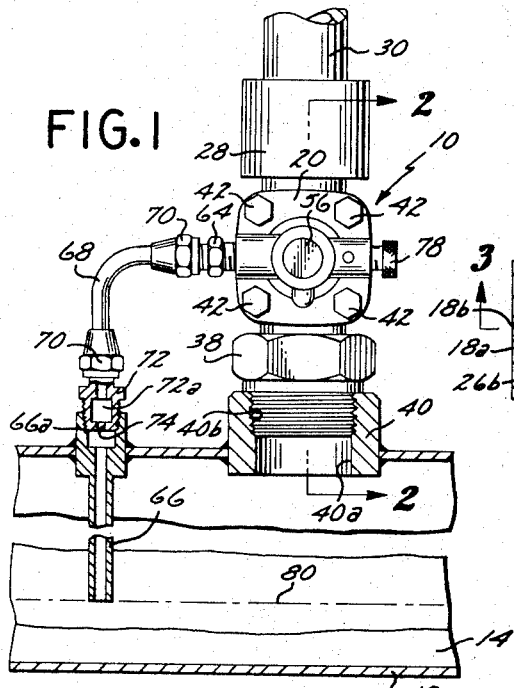
FIGURE 1 is a fragmentary sectional view through a vessel provided with a flow control device according to the present invention, such device being shown in side elevation.

Referring to FIGURE 1 of the drawings, there is shown therein a preferred embodiment for illustration of the present invention. Such embodiment is of a flow control device which is identified generally with the numeral 10. As shown in FIGURE 1, device 10 is associated with a vessel or tank 12 which is to be filled to a predetermined level with liquid petroleum 14 such as propane, butane or the like.

Although the present invention is particularly well suited for use in filling vessels, tanks, or containers with liquid gas or petroleum materials, it is realized that it is also applicable to many other fluids which are uncommonly volatile, and which vaporize very readily at normal ambient temperatures and pressures.

Figure 2:
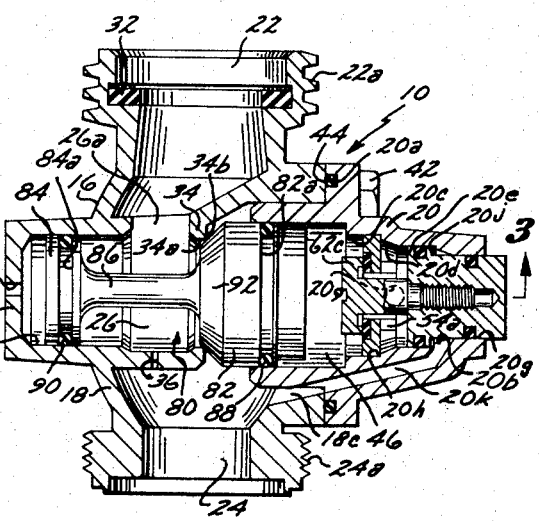
FIGURE 2 is a longitudinal sectional view through the automatic shutoff device of FIGURE 1, taken substantially along line 2—2 of FIGURE 1.
Figure 3:
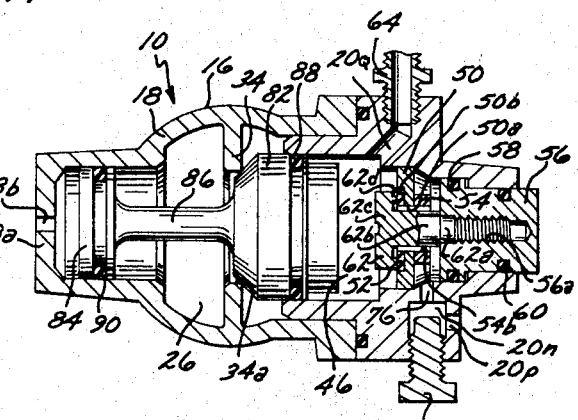
FIGURE 3 is another longitudinal sectional view through the device, taken substantially along line 3—3 of FIGURE 2.

As shown most clearly in the FIGURES 2 and 3 of the drawings, the subject flow control device 10 comprises a housing or body 16 which may be formed as desired, but which is shown in the drawings as comprising a valve housing 18 and a control housing 20. The reason for forming housing 16 in two parts will be readily apparent to those persons skilled in the art since it greatly facilitates assembly of the device as will hereinafter become more apparent. Such housing may be formed of any appropriate materials such as metal, plastics and the like, but such materials must be chemically stable in the presence of liquid petroleum or other fluid to be controlled.

Housing 16 may be formed by casting, machining or any other appropriate manufacturing method and is provided with an inlet 22, an outlet 24, and a valve chamber 26 therebetween. The inlet end 22 is formed with external threads as shown at 22a for receiving suitable coupling means 28 which is associated with a filling pipe or conduit 30, the latter of which leads from a suitable source (not shown) of liquid gas under pressure. To facilitate quick connection and disconnection of the coupling 28 with the inlet of valve body 18, the external fastening threads 22a are preferably large.

The types of fluids for which the present flow control device is particularly well adapted, and which are generally referred to herein as liquid gas, are normally stored in pressurized containers or vessels to maintain such fluid in liquid form, rather than in gaseous form as results at ordinary ambient temperatures and pressures. Such containers or sources of liquid petroleum gas are transported to the site where the vessel 12 is located and which is to be filled to a predetermined depth.

When such source reaches the site, additional pressure is applied to the container, so that the fluid is thereafter maintained in liquid form as it is pumped into the vessel by suitable pump means.

The inlet 22 of valve body or housing 18 may also be provided with suitable sealing means such as gasket 32 to assist in hermetically sealing the connection between conduit 30 and the flow control device 10 as will hereinafter become more apparent.

The valve chamber 26 of valve housing 18 is provided with an entrance opening 26a through which the liquid flows under pressure from the inlet 22.

Valve housing 18 is further provided with a cylindrical chamber or cavity 26b which is of substantially constant cross-sectional size throughout its length. As will be readily apparent to those persons skilled in the art, such cavity may be formed with a circular cross-section or substantially any other shape of cross-section as desired. The valve housing 18 at the end of cavity 26b comprises an end wall 18a which is provided with a bleed port 18b.

Valve body 18 is also provided with a web or partition wall 34 which extends across the valve chamber 26 and is provided with a valve opening 34a. The edge 34b of such partition wall around said opening constitutes a valve seat for flow control cooperation with a valve member to be hereinafter described.

A through opening or port 36 is formed in valve housing 18 for transmitting the inlet pressure to certain control elements as will hereinafter be described in detail.

The outlet 24 of valve body 18 is also provided with external fastening threads as at 24a for cooperation with a suitable fitting 38, the latter of which is associated with the vessel 12.

Referring to FIGURE 1 of the drawings, vessel 12 at or near its upper portion is provided with an inlet pipe or nipple 40 which is hermetically sealed within an appropriate opening formed in the wall of vessel 12, as by welding, brasing, soldering or the like. Such nipple has a through opening 40a, the upper end 40b of which is provided with internal fastening threads. One end of fitting 38 is provided with corresponding threads which firmly mate with the threads 40b of nipple 40. The opposite end of fitting 38 is formed with internal fastening threads for receiving the threads 24a at the outlet 24 of device 10. This arrangement enables the entire flow control device to be firmly fastened to the vessel 12 for adding liquid petroleum gas thereto.

The control housing 20 of housing 16 is firmly secured to valve housing 18 by suitable fastening bolts as shown at 42. An O-ring 44 is positioned within a suitable annular cutout or groove 20a formed in housing 20 to hermetically seal the engagement between such housing portion.

Control housing 20 is formed with a generally cylindrical chamber 46 which is axially aligned with the valve seat 34b and chamber 26b in valve housing 18 when the two housings are assembled for reasons which will hereinafter become more apparent. Such cylinder chamber 46 may be formed with a cross-section of substantially any desired shape in accordance with the function and operation to be hereinafter described.

Control housing 20 is further formed with a through opening 20b which communicates with the cylinder chamber 46. Such through opening 20b has wall portions which are generally cylindrical in shape at 20c, frustoconically shaped at 20d, and generally cylindrical at 20e and 20g. Such variations in size and shape provide a small annular shoulder 20h between cylindrical surface 20c and frusto-conical surface 20d, and another annular shoulder 20j between cylindrical surfaces 20e and 20g.

A valve seat disc 50 is firmly positioned within through opening 20b at the generally cylindrical portion 20c thereof. Such disc may be press-fitted into the housing 20 and, as shown in FIGURES 2 and 3, is positioned adjacent shoulder 20h. Disc 50 is annular in shape to firmly fit within the cylindrical opening 20c. It is provided with a through opening 50a and an annular cutout 50b about such opening. A sealing member such as valve seat 52 is positioned within such annular cutout about the opening 50a.

Suitable spacing means such as split-ring spacer 54 is provided on valve seat disc 50. Such spacer may be formed integrally with disc 50, or it may be formed separately and attached thereto in any appropriate manner as by welding, brasing, soldering or the like. Split-ring spacer 54 is provided with at least one transverse slot as shown at 54a in FIGURE 2 and is also provided with a centrally located opening 54b in alignment with the opening 50a of valve seat disc 50. Spacer 54 as will hereinafter become more apparent, ensures fluid flow through the device under certain conditions as will hereinafter appear.

A manually operated button 56 is slidably positioned within the cylindrical portions 20e and 20g of opening 20b. Such button carries a pair of O-rings 58 and 60 in suitable annular grooves provided for such purpose. The O-rings cooperate with the cylindrical surfaces 20e and 20g to provide a hermetic seal therebetween.

Manual button 56 is provided with a threaded aperture 56a for receiving the threaded stem 62a of a valve member 62. Valve member 62 is formed with a body portion 62b which extends through the openings 50a and 54b in the valve seat disc 50 and spacer 54, respectively. Adjacent said main body 62b is an annular valve portion 62c having an annular flange or lip 62d for engagement with the resilient annular valve seat member 52.

Control housing 20 is further formed with a passageway 20k which extends from the control chamber 46 externally of the housing 16. One end of passageway 20k is threaded for receiving a fitting 64. As shown in FIGURE 1 such fitting is connected to a dip tube 66 through an appropriate conduit 68 and other fittings 70. Dip tube 66 is firmly positioned within the vessel 12 as by welding, brasing, soldering or the like. The upper end of dip tube 66 is enlarged as at 66a and is provided with fastening threads for receiving an orifice member 72. The latter member is formed with a relatively large centrally located chamber 72a, and a first orifice 74 between such chamber and the dip tube 66, for reasons which will hereinafter be described.

Control housing 20 is further formed with a passageway 20k which communicates with corresponding passageway 18c formed in valve housing 18. The contiguously arranged passageways 18c and 20k permit fluid flow to the back of manually operated button 56 as will hereinafter be explained.

Control housing 20 is further provided with a chamber 20n, entrance to which is through a second orifice 76 from the through opening 20b as shown in FIGURE 3. An outlet 20p is provided for chamber 20n to vent certain pressures and fluid flow to the atmosphere. An emergency manually operated valve member 78 is threadedly positioned in housing 20 for flow permitting and flow preventing positions within chamber 20n as will hereinafter be explained.

Positioned within housing 16 is a flow control member 80 which comprises a cylindrically shaped piston 82 for reciprocation within control chamber 46, and a cylindrically shaped piston 84 for reciprocation within chamber or cavity 26b. A stem 86 interconnects the pistons 82 and 84 whereby such members are caused to operate simultaneously and in unison as will hereinafter appear. Such flow control member 80 may be formed as a unitary structure as by casting, machining or any similar operation, or it may be formed in predetermined parts which are subsequently connected together to form the unitary structure shown.

Each of the pistons 82 and 84 is formed with an annular groove as shown respectively at 82a and 84a for receiving a sealing O-ring as shown respectively at 88 and 90. Such O-rings, of course, provide a firm seal between the respective pistons and the corresponding cylinder walls.

Piston 82 is further formed with a frusto-conically shaped valve portion 92 which cooperates with valve seat 34b, to permit and prevent fluid flow from the inlet 22 to the outlet 24 of flow control device 10. That is, when such flow control member 80 is moved to the right, valve member 82 and valve portion 92 thereon are moved to flow permitting position relative to valve seat 34b. As such, fluid is permitted to flow from inlet 22 to outlet 24. On the other hand, when the member 80 is positioned as shown in FIGURES 2 and 3, such valve portion 92 is moved to flow preventing cooperation with seat 34b. As such, the fluid flow from inlet 22 to outlet 24 is interrupted.

The subject flow control device operates generally as follows, reference being had to the schematic showing in FIGURE 4 of the drawings for a simplified explanation thereof.

Flow control device 10 is intended for use in automatically interrupting fluid flow to a vessel or tank whenever a predetermined amount of liquid petroleum gas or other volatile material has been supplied thereto. Such fluids are extremely volatile, readily changing from liquid to gas at ordinary ambient temperatures and pressures. Also, such fluids have an extremely high thermal coefficient of expansion, thus requiring considerable expansion space above the liquid to prevent rupturing the vessel or other container.

Heretofore, a dip-tube was provided within the tank or vessel, which dip-tube was connected to an overflow pipe. When the vessel was filled to the desired depth, excess liquid would flow through the dip-tube and overflow pipe into the atmosphere. Upon reaching atmospheric conditions the liquid would quickly vaporize into large white clouds. Such clouds thus became the indicator for the operator to turn off the filling valve or pump.

Figure 4:
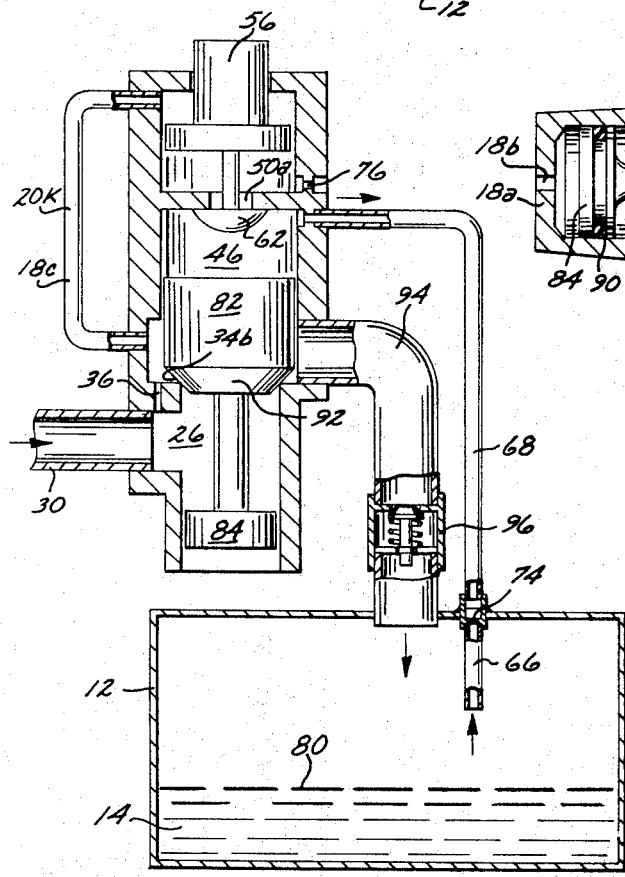
FIGURE 4 is a diagrammatic showing of the subject automatic shutoff device.

As indicated in FIGURES 1 and 4, the lowermost opening or inlet to the dip-tube 66 is positioned at the desired level 80 for the liquid petroleum gas within the vessel 12. Such level, of course, is predetermined so as to allow sufficient expansion space above the liquid.

The flow control device 10 is normally in the position shown in FIGURE 4. The conduit 30 leading from the source of liquid petroleum gas under pressure provides such fluid to the valve chamber 26 between the pistons 82 and 84. Such pressure within chamber 26 has little effect on the position of control member 80 due to the fact that the area of expansion of piston 82 to the inlet pressure is substantially equal to the area of exposure of piston 84 to such pressure. That is, as viewed in FIGURE 4, such inlet pressure urges the flow control member 80 in both an upward and a downward direction simultaneously and with substantially equal force.

In this regard, it should be noted that only that portion of valve 92 which is exposed to valve chamber 26 receives the inlet pressure. Even though opening 36 allows inlet fluid to flow beyond valve chamber 26, as will hereinafter be explained in greater detail, that portion of valve 92 not exposed to chamber 26 remains at the pressure of vessel 12.

Also, at this time, there is fluid pressure within the control chamber 46 which adds to the downward force supplied to flow control member 80, thus maintaining the latter in its flow preventing position. This pressure within control chamber 46, it will be noted, is not offset by an equal force in the opposite direction since bleed port 18b in the end wall 18a of housing 18 vents the back side of piston 84 to the atmosphere.

The pressure within control chamber 46 is obtained by virtue of the fact that the vapor pressure from vessel 12 is fed through dip tube 66 and conduit 68 into such control chamber while the flow control member 62 is in its flow preventing position. The fact that such member is in its flow preventing position permits chamber 46 to reach the pressure within vessel 12.

The inlet pressure from conduit 30 is also applied to the top of manual control button 56 through opening 36 and aligned passageways 18c and 20k. However, such pressure on the back of button 56 does not urge the same downwardly so as to move flow control member 62 into flow permitting position, due to the fact that the fluid pressure within chamber 46 on valve member 62 more than offsets such pressure on button 56. That is, by forming the button 56 and valve member 62 in accordance with the pressure from vessel 12 and the inlet pressure through conduit 30, it is possible to provide valve member 62 with sufficient area to maintain said valve closed.

When it is desired to permit filling of vessel 12, it is merely necessary to manually depress button 56 thereby moving flow control member 62 to open position. This results in an abrupt and marked decrease in fluid pressure within control chamber 46. That is, depressing control button 56 places control chamber 46 close to atmospheric pressure by virtue of the valve member 62 being moved to its flow permitting position. Said chamber 46 is thus vented through opening 50a and orifice 76 to the atmosphere.

Due to the fact that the conical valve portion 92 of control member 80 is slightly larger in diameter than the piston 84, flow control member 80 is moved upwardly as viewed in FIGURE 4. More specifically, the conically shaped valve portion 92 has a portion within the valve chamber 26 and a portion above the valve seat 34b. The latter portion is exposed to the inlet pressure by virtue of the port 36 which transmits the inlet pressure beyond valve member 82, even when the latter is in its flow preventing position.

As will be readily apparent to those persons skilled in the art, the size of valve member 82 relative to piston 84 can be arranged such that upon venting of control chamber 46 to atmospheric pressure, sufficient force differential results on flow control member 80 to move it to flow permitting position. As such, the liquid petroleum from the source is permitted to flow under pressure through the flow control device 10 from inlet 22 to outlet 24, such path including the valve chamber 26 and the valve opening 34a. The fluid thus flowing through the control device continues on through the filling conduit as shown at 94 in FIGURE 4. Suitable uni-directional flow control means such as the spring biased valve 96 shown in FIGURE 4 may be employed in the filling conduit to prevent reverse flow. Such check valves, however, are prevalent in the art, and may or may not be used in accordance with the particular desires and application.

The manually operable button 56 is held in open position by virtue of inlet pressure being applied to its back or top. That is, the pressure of the fluid at the inlet to flow control device is conducted to the control button 56 through port 36, passageways 18c and 20k. With the control chamber 46 pressurized, as when flow control member 62 is closed, the pressure on said flow control member is such as to retain button 56 in its retracted or off position. The size of the flow control element 62 can be determined in accordance with the area of the button 56 which is exposed to the inlet pressure such that the pressure within control chamber 46 maintains the valve element 62 closed. However, once the chamber 46 is vented to atmospheric pressure, the inlet pressure on the top or back of button 56 predominates so that the button 56 is then retained thereby in its depressed position with valve member 62 open.

As shown in the preferred embodiment of FIGURES 2 and 3, the button 56 is not permitted to hamper fluid flow from the control chamber 46 to the atmosphere through orifice 76, due to the above described split-ring spacer 54. Even though the button 56 may come to rest on the top of such spacer, the slot 54a therein permits fluid to flow from chamber 46 through opening 50a in valve seat element 50, and the opening 54b and slot 54a of spacer 54 to the orifice 76. Thus, even though the inlet pressure is utilized to maintain the button 56 in its depressed position, the chamber 46 is permitted to be evacuated to the atmosphere through orifice 76.

As the vessel 12 continues to fill, the liquid level therein continues to rise. The vapors above the fluid then pass upwardly through the conduit 68, and through the control chamber and orifice 76 to the atmosphere. Such vapor escapes to the atmosphere without causing any effect on the operation of the subject control device.

However, when the liquid level within vessel 12 reaches the dip-tube 66, such liquid is caused to flow upwardly through the dip-tube 66, first orifice 74, conduit 68, control chamber 46, opening 50a and second orifice 76. As the liquid passes through the first orifice 74 it is caused to simultaneously expand and vaporize because of the lower pressure within control chamber 46. Such expansion initially converts the liquid into gas which continues through the device. However, such expansion causes the temperature within control chamber 46 to drop appreciably due to the use of heat energy for such expansion. When this temperature drop occurs, the temperature-pressure conditions in chamber 46 become such that the liquid as it leaves the first orifice 74 is predominately in the liquid state. Thereafter, of course, less heat is absorbed so that the temperature increases whereupon the subsequent liquid flowing through orifice 74 is converted into its gaseous phase.

The cycling between gaseous and liquid phases continues but only for an extremely short period of time until the liquid within chamber 46 prevails. Such cycling is imperceptible; however, and the formation of liquid within the control chamber 46 takes place substantially simultaneously with the occurrence of the liquid level at the bottom of dip-tube 66.

Although an appreciable pressure drop takes place as gas or vapor is caused to flow through an orifice system of two or more orifices when liquid is caused to flow therethrough, a considerably smaller pressure drop results. That is, for example, with gas under 100 p.s.i. pressure, upon the flow thereof through an orifice, the pressure of such gas may decrease to approximately 20 p.s.i. With liquid under 100 p.s.i., on the other hand, such liquid flowing through the same orifice may result in a pressure of 60 p.s.i. on the downstream side of such orifice. That is, an appreciably higher pressure is obtained on the downstream side of an orifice when liquid flows therethrough as compared to a gas. This significant differential in pressure is utilized by the subject control device to automatically return the flow control device to its flow preventing position.

With liquid now flowing up the dip-tube 66 and through orifice 74, the pressure within chamber 46 is considerably higher than it was when gas or vapor was flowing up such dip-tube prior to the liquid within vessel 12 reaching the predetermined level. Such increased pressure within control chamber 46 does two things. Firstly, it pushes flow control element 80 to its flow preventing position wherein the flow control surface 92 is in engagement with valve seat 34b. Thus, whereas the prior gas pressure within chamber 46 was insufficient to overcome the forces holding flow control member 80 open, the increased pressure due to the liquid is now sufficient to close such member.

The second function performed by the increased pressure within chamber 46 is to return flow control member 62 to its flow preventing position in engagement with valve seat 52. This latter function is obtained by the increased liquid pressure in chamber 46 overcoming the retaining pressure on the top of push button 56 as above explained. This functional result is obtained by selecting the proper size and surface areas for the control element 62 as well as for the flange around the push button 56, which flange is exposed to the inlet pressure through the passageways 18c and 20k.

Thus, the flow control device 10 is automatically and abruptly returned to its flow preventing position without the need for any human effort or function whatever. The liquid level within vessel 12 is thus at the proper position or height whereby the proper expansion space is afforded thereabove.

Thereafter the source of liquid petroleum can be disconnected from the vessel 12 and transported to another site for filling other vessels in the same manner.

The manually operable valve member 78 can be operated to prevent flow of liquid or gas through the control chamber 46, merely by turning the same into closed position against orifice 76. This can be done in the event of an emergency and causes the pressure within chamber 46 to increase to the vessel pressure so that the flow control element 80 as well as the manually operable push button 56 are thereby automatically moved to their flow preventing positions. This control feature may be used under emergency conditions as for instance in the event of a malfunction of certain parts in the flow control device 10 or in the vessel or filling apparatus.

It is thus seen that the present invention provides a flow control device which is uniquely operable to automatically interrupt the flow of vapor and liquid to shutoff the primary flow of liquid petroleum upon the occurrence of liquid in a given place. The subject device is particularly well adapted for use in filling vessels, tanks, or containers with liquid petroleum or other highly volatile substance which vaporize readily at ordinary ambient conditions.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. An automatic shutoff device for use in filling a container with liquefied gas comprising in combination, a housing having an inlet and an outlet in communication with the interior of said container, means including a pressure responsive flow control member between said inlet and outlet in said housing urged toward flow permitting position by liquefied gas at said inlet, said housing being formed with a control chamber exposed to said flow control member to cause pressure therewithin to urge said control member toward flow preventing position, conduit means affording communication between said chamber and the interior of said container to conduct fluid at a given level in said container to said chamber, and means rendering said flow control member capable of distinguishing between vapor and liquid pressure from said container over a substantially wide range of ambient condition variations within said container, whereby said flow control member is operable to interrupt filling of said container when liquid reaches said given level regardless of ambient condition variations within said range.

2. An automatic shutoff device for use in filling a container with liquefied gas according to claim 1, wherein said means for distinguishing between vapor and liquid pressure comprises substantially similar flow restricting means leading to and from said control chamber, whereby ambient condition variations within said container effect similar variations in the pressure drop across said restricting means to thereby render the effect of the pressure in said chamber on said flow control member substantially immune to said ambient condition variations.

3. An automatic shutoff device for use in filling a container with liquefied gas according to claim 1 wherein said control chamber is vented and said means for distinguishing vapor and liquid pressure comprises a pair of substantially similar orifices in said conduit means and said vent, respectively.

4. An automatic shutoff device for use in filling a container with liquefied gas according to claim 3 wherein manual means is provided for controlling communication of said chamber with said vent to thereby control initial movement of said control member to flow permitting position to effect filling of said container.

5. An automatic shutoff device for use in filling a container with liquefied gas according to claim 4 wherein said manual means comprises a valve member normally preventing venting of said control chamber to the atmosphere, whereby the pressure within said container is in said control chamber to normally retain said flow control member in flow preventing position.

6. An automatic shutoff device for use in filling a container with liquefied gas according to claim 5 wherein said similar orifices in said conduit and vent are of such size as to minimize the pressure within said control chamber caused by vapor and to maximize pressure therewithin caused by liquid to thereby render said automatic shutoff device more sensitive.

7. An automatic shutoff device for use in filling a container with liquefied gas according to claim 6 wherein said flow control member is rectilinearly movable between said flow permitting and flow preventing positions and said control chamber is formed in said housing at one end of said flow control member.

References Cited

UNITED STATES PATENTS

| | | | |
|---|---|---|---|
| 1,632,168 | 6/1927 | Buckman et al. | 251—320 |
| 2,405,998 | 8/1946 | Buttner et al. | 62—52 |
| 2,813,402 | 11/1957 | Poethig et al. | 137—109 |
| 2,967,541 | 1/1961 | Norway et al. | 137—393 |
| 3,021,684 | 2/1962 | Berck | 62—49 |
| 3,269,404 | 8/1966 | Lebow | 137—393 X |

WILLIAM F. O'DEA, *Primary Examiner.*

D. R. MATTHEWS, *Assistant Examiner.*